W. N. CORNELL.
Method and Apparatus for Making Wood Paper Stock.
No. 211,134. Patented Jan. 7, 1879.
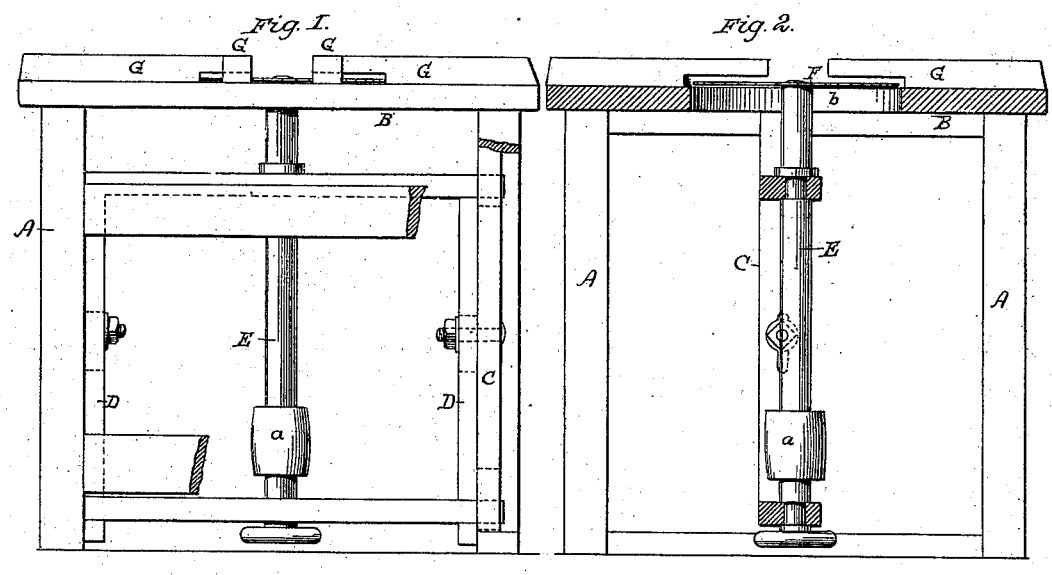
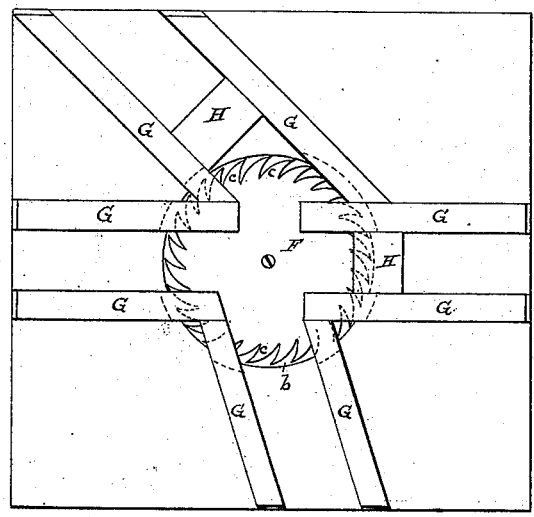
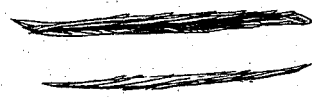
WITNESSES:
C. Clarence Poole
Warren Sully
INVENTOR:
William N. Cornell
by Geo. W. Dyer & Co.
Attys

UNITED STATES PATENT OFFICE.

WILLIAM N. CORNELL, OF PULASKI, NEW YORK.

IMPROVEMENT IN METHODS AND APPARATUS FOR MAKING WOOD PAPER-STOCK.

Specification forming part of Letters Patent No. 211,134, dated January 7, 1879; application filed May 20, 1878.

*To all whom it may concern:*

Be it known that I, WILLIAM N. CORNELL, of Pulaski, in the county of Oswego and State of New York, have invented a new and useful Improvement in Method and Apparatus for Making Wood Paper-Stock; and I do hereby declare that the following is a full and exact description of the same, reference being had to the accompanying drawings, and to the letters of reference marked thereon.

The purpose which I have in view is the production of a better wood stock for the manufacture of wood paper, which stock will be better because the wood can be reduced to a fineness sufficient for pulping with less destruction of its fibrous character than by the means commonly employed; and my invention consists, primarily, in the method employed in obtaining the stock by sawing the same out of proper woods, the fiber of such woods being presented to the saw at right angles, or nearly at right angles, to the radial lines of the saw, and also at right angles with the axis of rotation of the saw, instead of grinding or shaving or cutting out the fibers of the wood, as usually practiced.

My invention also consists in the mechanism employed by me in sawing out the fiber of the wood; and, lastly, it consists in the stock itself, produced substantially as described.

In order that those skilled in the art may know how to make and produce my wood paper-stock, I proceed to describe the same and its manner of production, first describing one form of the mechanism employed, and having reference to the accompanying drawing, in which—

Figure 1 is an elevation; Fig. 2, a vertical central section; Fig. 3, a plan view from above; and Fig. 4, a separate view of one of the pieces sawed out, or the stock.

In the drawings similar letters denote like parts in each figure.

A represents a frame-work, which supports a table, B, which frame-work has side posts C C, to which a saw-frame, D, is secured with freedom of adjustability vertically. In this saw-frame a saw-shaft, E, is pivoted, which shaft is provided with a suitable drum, a, for driving the shaft. Upon the top of this shaft is secured a thick circular saw, F, rotating just above a circular opening, b, in the table B. This saw has hooked large teeth c, which are filed as the teeth of rip-saws are filed, and may be "set" a little in each direction to give a better clearance and avoid binding. The periphery of this saw revolves as closely as possible to the top of the table.

Upon the top of the table are placed suitable guides G, in which are placed the blocks of wood H, which are to be reduced to paper-stock, which guides are placed either radially to the center of the saw or tangentially to a small degree. In connection with these guides any ordinary proper mechanism may be employed for holding the blocks H down upon the table and for feeding them up to the saw and withdrawing them, such as has been long employed in shingle-machines and other forms of mechanism.

In operation the pieces of wood H, prepared in any convenient way into blocks of convenient size, are placed in the guides with the fiber of the wood presented at right angles, or nearly so, to the radial lines of the saw, and the saw set in motion will saw out its thickness or the cutting-surface of its teeth from the bottom of such block, producing slivers or small particles of considerable length, as shown in Fig. 4, each of which is thickest in the middle and tapering at the ends, with all the fibers loosened and partially separated by the splitting, tearing, and bending action of the saw.

It is evident that more than one saw may be employed, and that the saw or saws may be arranged vertically without departing from the spirit of my invention.

When this paper-stock is produced, as above stated, it may be packed in any convenient way for transportation and sale as an article of merchandise.

In the further treatment of this stock it may be subjected to the usual process of disintegration before pulping, and it will be found that, by this operation of sawing, all the fibers of the wood have been loosened or separated without breaking them, and the processes of disintegration can be performed more speedily, cheaply, and effectually.

Having thus described my invention, what I claim as new therein is—

1. The method herein described of sawing out paper-stock in the direction of the grain of the wood, substantially as described.

2. The mechanism, substantially as described, for sawing out paper-stock, consisting of the rip-saw F and the guides G, substantially as described.

3. As a new article of manufacture and sale, paper-stock produced by sawing out the same lengthwise of the grain, substantially as described.

This specification signed and witnessed this 13th day of May, 1878.

WILLIAM N. CORNELL.

Witnesses:
    JOHN W. RICHARDS,
    R. L. INGERSOLL.